United States Patent
Ammundi et al.

(10) Patent No.: US 8,166,536 B1
(45) Date of Patent: Apr. 24, 2012

(54) TRANSFORMATION OF NETWORK FILTER EXPRESSIONS TO A CONTENT ADDRESSABLE MEMORY FORMAT

(75) Inventors: Anand Ammundi, Cupertino, CA (US); Sandip Shah, Milpitas, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 533 days.

(21) Appl. No.: 12/368,726

(22) Filed: Feb. 10, 2009

(51) Int. Cl.
*H04L 21/00* (2006.01)

(52) U.S. Cl. .......................... 726/11; 711/101; 711/108

(58) Field of Classification Search .............. 726/11–15; 711/101, 108
See application file for complete search history.

(56) References Cited

U.S. PATENT DOCUMENTS

| | | | |
|---|---|---|---|
| 7,656,716 B1 * | 2/2010 | Srinivasan et al. | 365/189.02 |
| 7,916,510 B1 * | 3/2011 | Starovoitov et al. | 365/49.1 |
| 7,924,590 B1 * | 4/2011 | Starovoitov et al. | 365/49.17 |
| 2003/0185211 A1 * | 10/2003 | Yang | 370/392 |
| 2003/0223408 A1 * | 12/2003 | Chen et al. | 370/352 |
| 2006/0155915 A1 * | 7/2006 | Pereira | 711/100 |
| 2008/0294620 A1 * | 11/2008 | Churin et al. | 707/5 |

OTHER PUBLICATIONS

Che, Hao et al "DRES: Dynamic Range Encoding Scheme for TCAM Coprocessor." Jul. 2008. IEEE. vol. 57 No. 7. 902-915.*

* cited by examiner

*Primary Examiner* — Nasser Goodarzi
*Assistant Examiner* — Kendall Dolly
(74) *Attorney, Agent, or Firm* — Harrity & Harrity, LLP

(57) ABSTRACT

A network device, such as a firewall, may be configured to filter network traffic. The filter may include regular expressions that are converted by the firewall into a format that can be stored in a ternary content addressable memory. In one exemplary implementation, the filter definition may include one or more input regular expressions that include variables that are compared to a result based on an equality/inequality relationship, where multiple variables are combined using logical operations selected from a set of logical operations including (but not limited to) logical AND and logical OR operations. The firewall may convert the input regular expressions into a format in which the equality/inequality relationships are converted to a pure equality relationship and the multiple variables are combined using only logical OR operations. The firewall may program the ternary content-addressable memory to implement the filter based on the converted one or more input regular expressions.

20 Claims, 12 Drawing Sheets

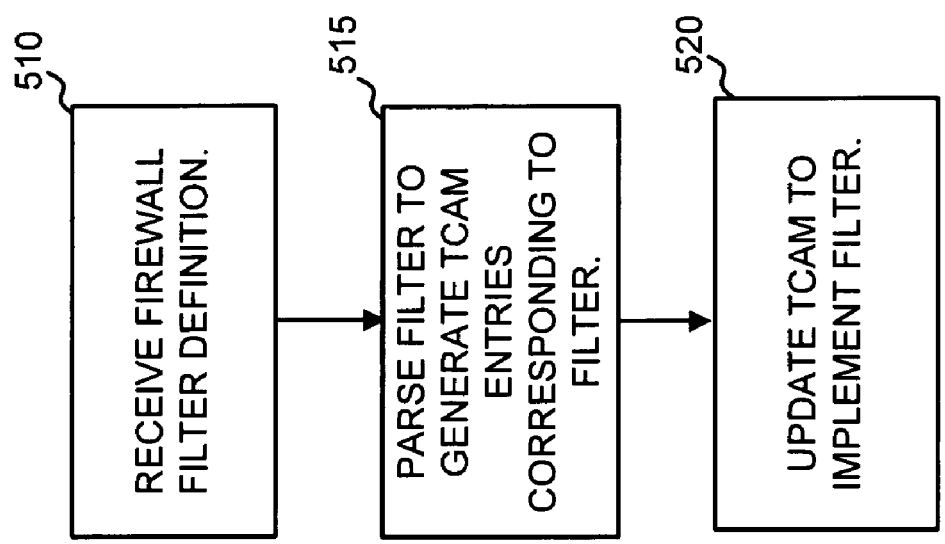

```
T1 { [match IP Source Address 1.1.1.1 ~610
615~ match tcp-flags == (!syn & ack) | !fin]
      action discard ~625
}
```
                                    ⎫
                                    ⎬ 620
                                    ⎭

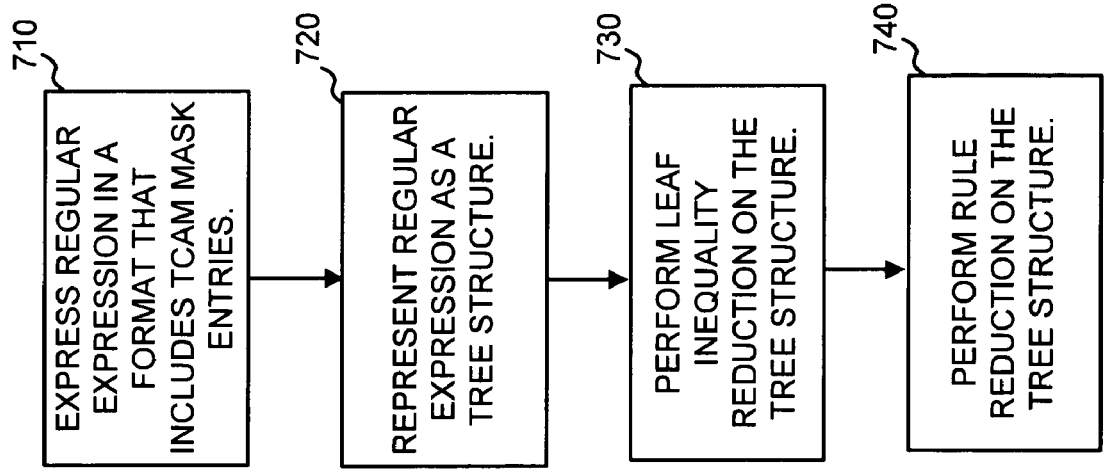

TRANSFORMATION OF NETWORK FILTER EXPRESSIONS TO A CONTENT ADDRESSABLE MEMORY FORMAT

BACKGROUND

Computing and communication networks typically include devices, such as routers, switches or gateways, which transfer or switch data, such as packets, from one or more sources to one or more destinations. A packet is a structure that encapsulates data for transmission through a network based on control information that is stored in a header portion of the packet. A router is a switching device that can receive a packet and, based on the packet header, may forward the packet towards its final destination.

A firewall is a device that inspects network traffic passing through it, and may perform actions, such as denying or permitting passage of the traffic based on a set of rules. Firewalls may be implemented as stand alone network devices or, in some cases, integrated in a single network device, such as a router or switch, that performs other functions. For instance, a network switch may perform firewall related functions as well as switching functions.

SUMMARY

One implementation is directed to a method that includes receiving, by a network device, a filter definition that includes one or more input regular expressions that include variables that are compared to a result based on an equality/inequality relationship and where multiple variables are combined using logical operations selected from a set of logical operations including logical AND and logical OR operations. The network device may convert the one or more input regular expressions into a format in which the equality/inequality relationships are converted to a pure equality relationship and the multiple variables are combined using only logical OR operations. A ternary content-addressable memory may be programmed to implement the filter based on the converted one or more input regular expressions.

In another implementation, a network device may include a ternary content-addressable memory (TCAM) that stores rules that are matched to incoming network data units to implement a network filter and a control portion to control operation of the network device. The control portion may receive a filter definition that includes at least one filter condition that includes a bit operation represented as a regular expression, the regular expression including variables that are compared to a result based on an equality/inequality relationship and where multiple variables are combined using logical operations selected from a set of logical operations including logical AND and logical OR operations. The control portion may additionally convert the regular expression into a format in which the equality/inequality relationships are converted to a pure equality relationship and the multiple variables are combined using only logical OR operations. The control portion may additionally program the TCAM to embody the received filter definition, where entries in the TCAM corresponding to the regular expression are programmed based on the converted regular expression, which is a TCAM "friendly" expression.

BRIEF DESCRIPTION OF THE DRAWINGS

The accompanying drawings, which are incorporated in and constitute a part of this specification, illustrate one or more embodiments described here and, together with the description, explain these embodiments. In the drawings:

FIG. 5 is a flow chart illustrating exemplary operations through which a firewall may configure itself;

FIGS. 6A and 6B are diagrams illustrating an exemplary firewall filter;

FIG. 7 is a flow chart illustrating exemplary operations for converting a regular expression to a TCAM friendly regular expression;

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

As described herein, a network device, such as a firewall, may be configured to filter network traffic. The filter may be specified using a number of possible match conditions and corresponding actions. The match conditions may include bit matching conditions that are specified as potentially complex regular expressions. The firewall may convert these regular expressions into a format that can be stored in a ternary content addressable memory (TCAM).

Exemplary System Overview

Figure 1:
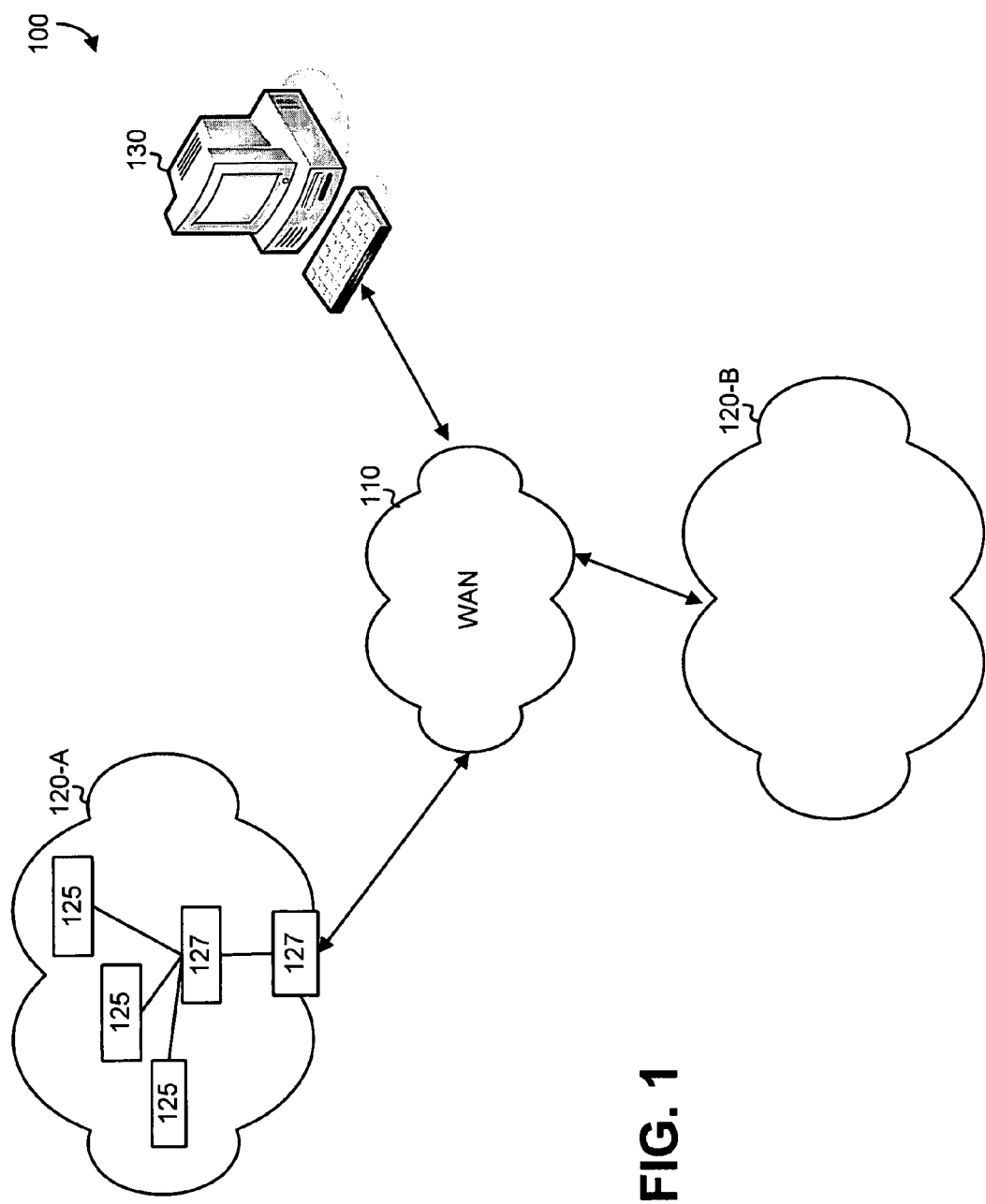
FIG. 1 is a diagram of an exemplary system in which concepts described herein may be implemented.

FIG. 1 is a diagram of an exemplary system 100 in which concepts described herein may be implemented. System 100 may include a wide area network (WAN) 110 connected to one or more private networks 120-A and 120-B (collectively referred to as private networks 120) and a computing device 130. Private networks 120 may each, for example, include corporate or individual local area networks (LANs).

WAN 110 may generally include one or more types of networks. For instance, WAN 110 may include a cellular network, a satellite network, the Internet, or a combination of these networks that that are used to transport data. Although shown as a single element in FIG. 1, WAN 110 may include a number of separate networks that function to provide services to private networks 120 and computing devices, such as computing device 130.

Private networks 120 may each include a number of computing devices, such as, for example, client computing stations 125, and network devices 127. Client computing stations 125 may include computing devices of end-users, such as desktop computers or laptops. Network devices 127 may include, for example, firewalls, switches, routers, combinations of these devices, or other devices relating to network implementation, control, and/or security.

Computing device 130 may include, for example, a laptop or personal computer connected to WAN 110. Alternatively, computing device 130 may include a mobile device, such as a cell phone, etc.

In the exemplary system shown in FIG. 1, two private networks 120-A and 120-B and one computing device 130 are shown. In other implementations, system 100 may include additional, fewer, different, or differently arranged networks and/or devices.

Exemplary Device Architecture

Figure 2:
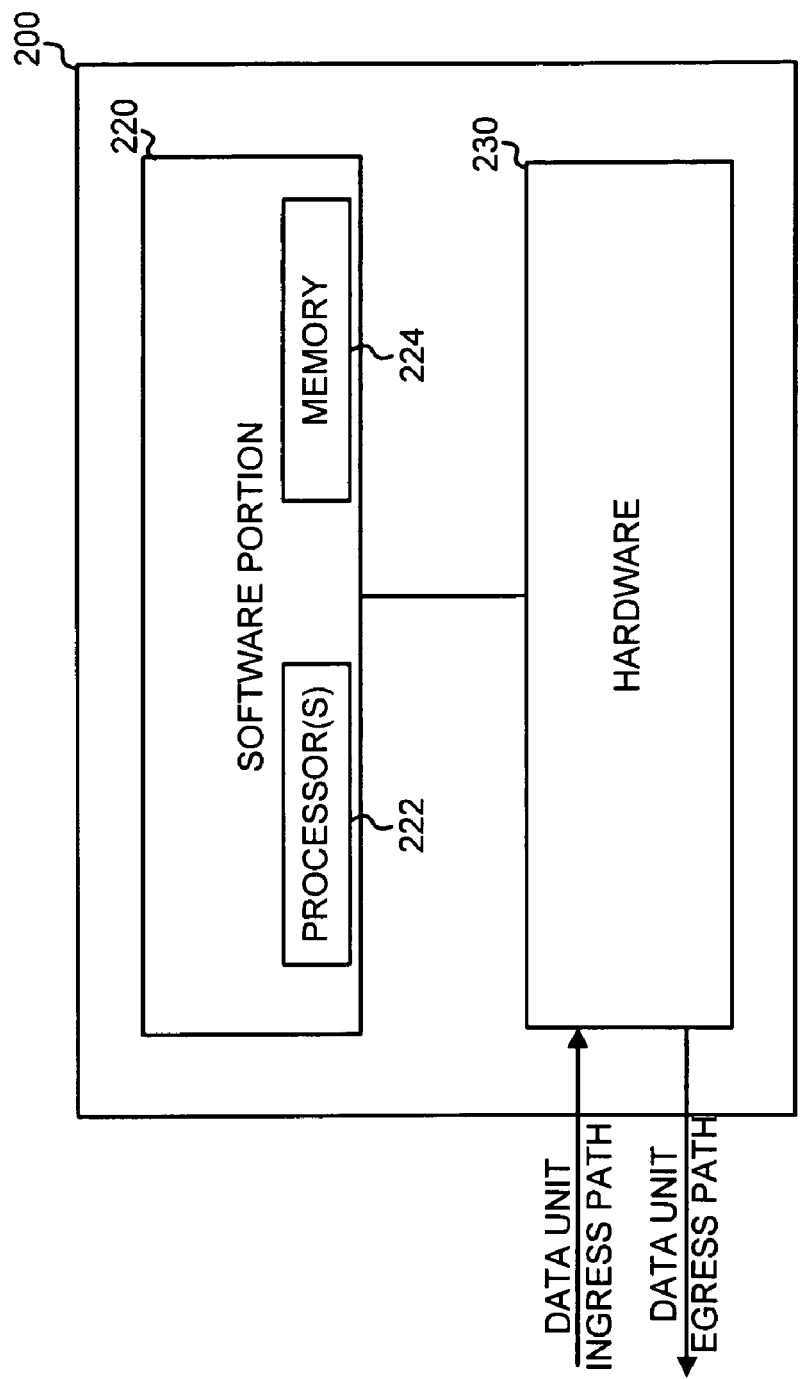
FIG. 2 is a block diagram of an exemplary firewall.

In one exemplary implementation, network devices 127 may include functionality relating to network data inspection (e.g., a firewall). FIG. 2 is a block diagram of an exemplary firewall 200, which may correspond to one of network devices 127 that is a dedicated firewall or includes an integrated firewall. In order to increase its performance, firewall 200 may use dedicated hardware to process or assist in processing incoming data units, where a data unit is defined as packet-based or non-packet based information. As shown in FIG. 2, firewall 200 may include software portion 220 and hardware portion 230.

Software portion 220 may include software designed to control firewall 200. For example, software portion 220 may control hardware portion 230 and provide an interface for user configuration of firewall 200. In general, software portion 220 may implement the functions of the firewall that are either related to control or that can be implemented in the "slow path" through firewall 200. Software portion 220, although shown as a single abstract block 220 in FIG. 2, may be implemented through, for example, one or more general purpose processors 222 and one or more computer memories 224. Processors 222 may include processors, microprocessors, or other types of processing logic that may interpret and execute instructions. Computer memories 224 (also referred to as computer-readable media herein) may include random access memory (RAM), read-only memory (ROM), or another type of dynamic or static storage device that may store information and instructions for execution by processors 222.

Hardware portion 230 may include circuitry for efficiently processing data units received by network device 200. Hardware portion 230 may include, for example, logic, such as an application specific integrated circuit (ASIC), a field programmable gate array (FPGA), and/or a ternary content-addressable memory (CAM). Hardware portion 230 may, for example, receive incoming data units, extract header information for the data units, and process the data units based on the extracted header information.

It can be appreciated that although firewall 200 is shown as including a software portion 220 and a hardware portion 230, firewall 200 may, in some implementations, be implemented entirely through hardware.

Firewall 200 may inspect network traffic passing through the device and may perform actions, such as to deny or permit passage of the traffic based on rules defined for the firewall. To maximize the performance of the firewall, the comparison of the incoming traffic to the firewall rules may be made in hardware portion 230.

Figure 3:
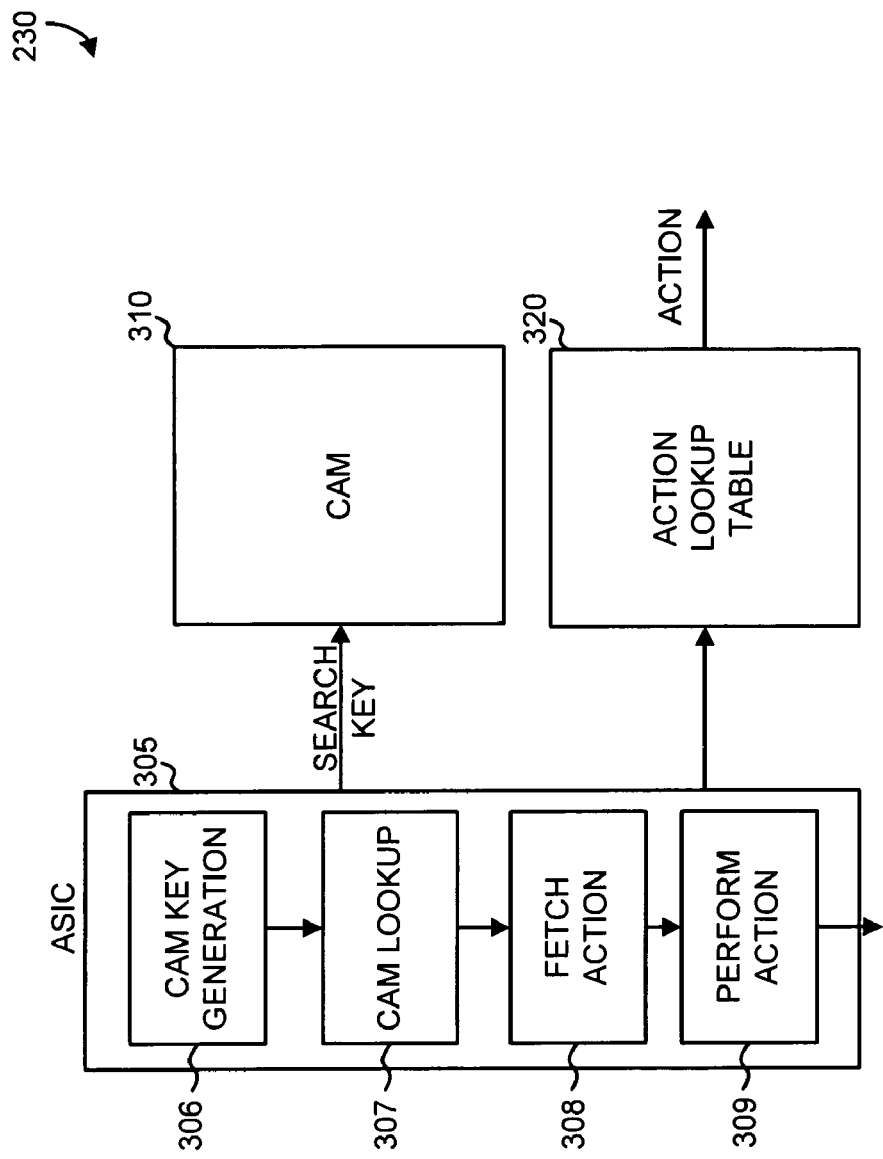
FIG. 3 is a diagram illustrating exemplary components in a hardware portion of a firewall that may be used by the firewall in inspecting network traffic.

FIG. 3 is a diagram illustrating exemplary components in hardware portion 230 that may be used by firewall 200 in inspecting network traffic. Hardware portion 230 may include a control application specific integrated circuit (ASIC) 305, a content-addressable memory (CAM) 310, and an action lookup table 320.

ASIC 305 may generally orchestrate or perform control functions for accessing CAM 310 and action lookup table 320. ASIC 305 may, for instance, form a search key for CAM 310 and input the search key to CAM 310. ASIC 305 may also control the lookup into action lookup table 320. ASIC 305 may also handle the updating or programming of CAM 310 and action lookup table 320.

A CAM, in general, is a type of associative computer memory that is designed for high-speed searching applications. Unlike standard random access computer memory in which the memory returns a data word based on a supplied address, CAM 310 may be designed such that, in response to a data word, CAM 310 may perform a parallel search of its entire memory to determine if that data word is stored. If the data word is found, CAM 310 may return a list of the storage addresses where the data word was found.

In one implementation, CAM 310 may particularly be a ternary CAM (TCAM). A TCAM is a CAM that allows states in the CAM to be specified as "don't care" states. For example, a TCAM might have an entry such as "10XX0," where "X" indicates the "don't care" state. This entry will match any of the four search keys: "10000," "10010," "10100," or "10110." TCAMs may be implemented in which two entries are written to the TCAM for each search item: a first entry corresponding to the pattern that is to be matched and a second "mask" entry that specifies which fields in the first entry are "don't care" states. For instance, for the example entry "10XX0," two values may be written to the TCAM. The first value may be the pattern "10110," where the "11" in the pattern can be set to any value (e.g., "11", "01", "10", or "00"). The second value may be the mask entry "00110", where a "1" indicates that the corresponding data in the pattern is to be masked (i.e., it is a "don't care" state). It can be appreciated that whether a logical "1" or "0" is used to indicate a "don't care" is arbitrary. In other words, in some TCAM implementations a "0" may indicate a "don't care" state (i.e. the mask entry would then be "11001").

The address of the highest priority match that corresponds to a particular search key may, after output by CAM 310, be input to action lookup table 320 to obtain an action corresponding to the match. The action may be, for example, drop (discard) the corresponding data unit, accept (i.e., pass or do not drop) the data unit, increment a counter, or other actions. The action may then be implemented by a subsequent section of hardware portion 230 or by software portion 220. The priority for the highest priority match may be defined by, for example, lower address values in CAM 310 having higher priority (i.e., the highest priority is at the first row of CAM 310 and the lowest priority is the last row). In other implementations, priority may be defined differently.

Exemplary operations that may be performed by ASIC 305 are shown in ASIC 305 as CAM key generation component 306, CAM lookup component 307, fetch action component 308, and perform action component 309. Each component 306, 307, 308, and 309 may correspond to a specific portion of ASIC 305. Each of these actions may be performed by ASIC 305 for each received data unit. CAM key generation component 306 may generate a search key corresponding to the data unit. For example, for a packet, a key may be constructed that includes portions that represent: a source port for the packet, a destination port for the packet, a source Internet Protocol (IP) address for the packet, and a destination IP address for the packet. The key may be input to CAM 310, which may return a list of the entries in CAM 310 that match the key or, alternatively, CAM 310 may return only the highest priority entry that matches the key. CAM lookup 307 may control the input of the key to CAM 310.

ASIC 305, through CAM lookup component 307, may fetch the action for the data unit based on the lookup into CAM 310. The result of the lookup into CAM 310 may then be used by fetch action component 308 to fetch the action that is to be performed on the data unit from action lookup table 320. Perform action component 309 may then perform this action on the data unit. As previously mentioned, the action may include, for instance, dropping the data unit, accepting (i.e., not dropping) the data unit, or incrementing a counter based on the data unit.

In summary, the operation of firewall 200 may include receiving a data unit (e.g., a packet), constructing a search key based on fields of the data unit, looking up the search key in CAM 310, and performing an action on the data unit based on the result of the lookup.

Figure 4:
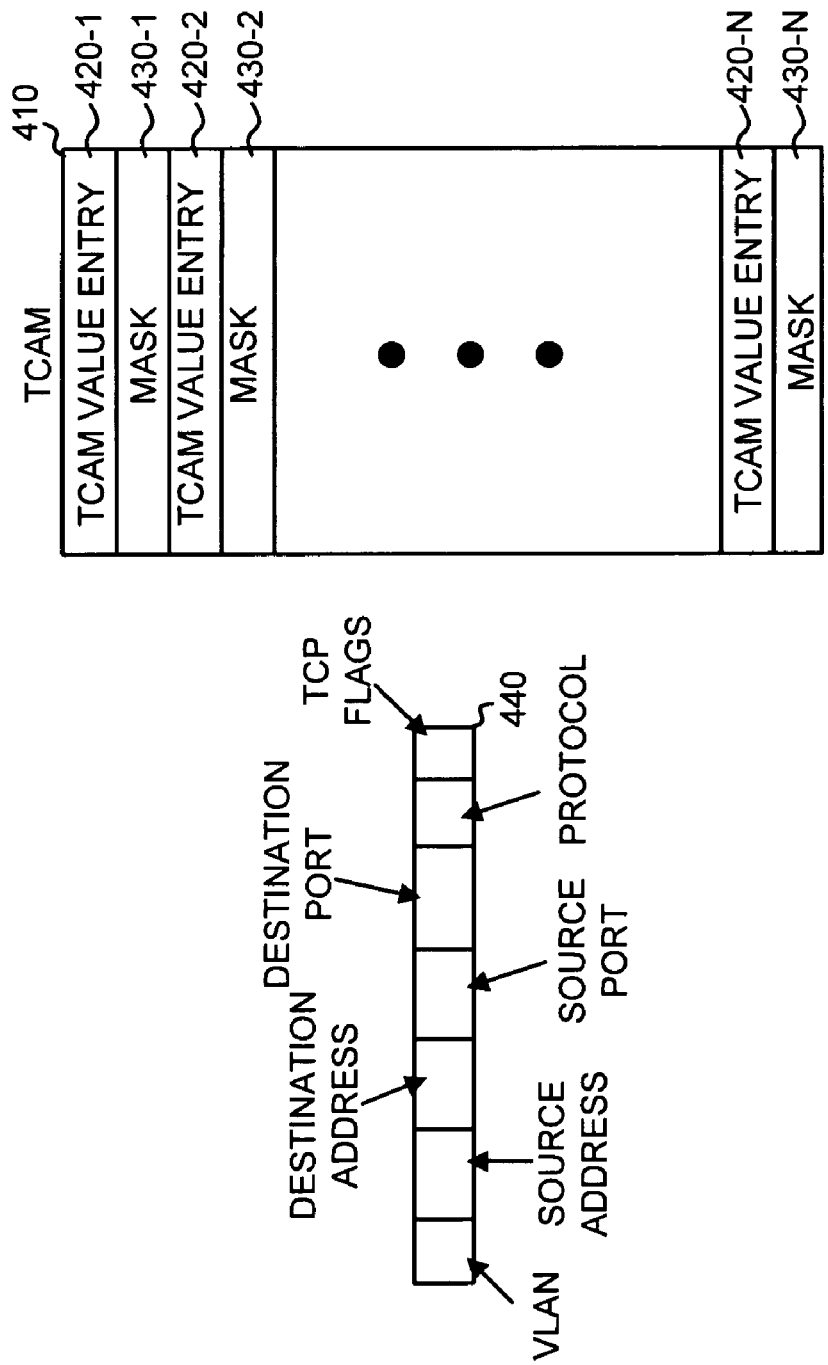
FIG. 4 is a diagram illustrating an exemplary implementation of a content-addressable memory (CAM)

FIG. 4 is a diagram illustrating an exemplary implementation of CAM 310. In this example, CAM 310 is a TCAM, labeled as TCAM 410. TCAM 410 may include a number of TCAM value entries 420-1 through 420-N. Each TCAM value entry 420 may be associated with a corresponding mask field 430-1 through 430-N. The data to store in each TCAM value entry 420 and each mask field 430 may be programmed into TCAM 410 during, for example, configuration of firewall 200.

In the example of FIG. 4, an input search key 440 is constructed based on portions of an IP packet and includes fields based on the incoming virtual LAN (VLAN), source address, destination address, source port, destination port, and protocol. Additionally, input search key 440 includes a field for TCP flags that may be used when the IP packet includes data sent over TCP. A number of other possible fields could be included in search key 440. In some implementations, the particular fields that are to be used in a search key for firewall 200 may be programmable by the end user. Each incoming packet may have a search key 440 constructed for the packet. The entire search key may then be simultaneously applied to each of TCAM value entries 420. Mask fields 430 may be applied to select which bits of each entry must match and which can be ignored. If all of the values match in all of the bit locations that are unmasked, then the corresponding entry of TCAM 410 may be considered to be a match. If multiple entries in TCAM 410 are determined to be matches, TCAM 410 may apply a priority selection scheme to output the highest priority match. For instance, value entry 420-1 may be the highest priority entry, value entry 420-2 may be the next highest priority entry, and so forth.

Firewall 200, and hence TCAM 410, may operate on a packet-by-packet basis. That is, each received packet may be looked-up in TCAM 410 and an action performed for the packet based on the lookup.

In one particular implementation, TCAM 410 may be able to store and process up to approximately 14 thousand entries simultaneously, where each value entry may have a width of 24 bytes. It can be appreciated that the particularly described configuration and logical operation of TCAM 410 is exemplary (e.g., each entry may be a different number of bytes and there may be a larger or smaller number of entries stored in TCAM 410).

Network Device Operation

The operation of firewall 200 in controlling hardware portion 230 to process traffic flows according to user defined filters that include bit operations expressed through regular expressions will now be described.

FIG. 5 is a flow chart illustrating exemplary operations through which firewall 200 may configure hardware portion 230. For the discussion of FIG. 5, assume firewall 200 uses TCAM 410 to implement the filtering rules.

A user of firewall 200 may create a filter that reflects the policies that the user would like to implement. Firewall 200 may receive the filter definition (block 510). The filter may be, for example, a text file created by the user. Firewall 200 may parse the filter and generate TCAM entries corresponding to the filter (block 515). The TCAM entries may be in a form suitable for writing to TCAM 410. In other words, the TCAM entries should be expressed as one or more TCAM value entries 420 and corresponding mask entries 430. Conversion of certain filter expressions that are in a TCAM "unfriendly" format to a TCAM friendly format will be discussed in more detail below.

The TCAM value entries 420 and mask entries 430 that are generated in block 515 may be written to TCAM 410 to update the TCAM and thereby program the firewall (block 520).

FIGS. 6A and 6B are diagrams illustrating an exemplary firewall filter "F1". As shown in FIG. 6A, filter F1 600 may include one or more terms labeled as terms T1, T2, and T3. Each term may be a collection of match conditions and the corresponding actions that are to be taken if the match conditions are met. Each match condition may be specified as an attribute (e.g., source address, destination address, receive port, etc.) and a corresponding value for the attribute. The terms may have a logical OR relationship among themselves and the order of the terms may be relevant to the implementation of the filter. For instance, if terms T1 and T2 are satisfied, the action corresponding to the higher priority term (e.g., T1) will be performed and the action corresponding to the lower priority term (e.g., T2) will not be performed. Typically, terms occurring first in a filter have higher priority over later occurring terms.

FIG. 6B is a diagram illustrating an exemplary term, term T1, for filter F1 600. As shown in FIG. 6B, term T1 includes two match conditions 610 and 615, and an action 625. Each of match conditions 610 and 615 may be specified using the term "match" followed by a match attribute and a match value. Match condition 610, for instance, specifies the attribute "IP Source Address" and the value "1.1.1.1." In other words, for this condition to be satisfied, the source IP address for a data unit should be "1.1.1.1". Match condition 615 is an exemplary bit-field match condition. In this example, the match condition is satisfied when certain bits in a TCP header for a packet match the regular expression 620. In this example, the condition is satisfied when the "syn" bit (synchronization bit) is not set (i.e., set to logical zero) and the "ack" bit (acknowledgement bit) is set, or the "fin" bit (finish bit) is not set. If both match conditions 610 and 615 are satisfied, action 625 may be performed by firewall 200. In this case, action 625 specifies that the data unit should be discarded.

When parsing regular expressions, such as regular expression 620, firewall 200 may support operators for each variable in the regular expression (e.g., syn, ack, and fin) that can either be "equal to" or "not equal to" a result. For regular expression 620, for instance, the syn bit and the fin bit were specified as being not equal to their set state and the ack bit was specified as being equal to its set state. In addition, it may be desirable for firewall 200 to support logical operations between variables that can include both OR and AND logical operations. In regular expression 620, "|" indicates a logical OR operation and "&" the logical AND operation. Still further, although the variables shown in FIG. 6B represent single bit values, more generally, it may be desirable for firewall 200 to support variables that can support multi-bit vector values. For example, a more complex regular expression similar to regular expression 620 may be: [(A!=B)|(C==D) & (E==F)], where A through F may each represent a multi-bit (vector) value. Here, the notation "!=" is used for the "not equals" operator and "==" is used for the "equals" operator.

A TCAM, such as TCAM 410, can inherently support a regular expression of the form (A==B)|(C==D)|(E==F), etc. More particularly, because bits within a TCAM value entry 420 are inherently matched as being equal to the incoming key and different TCAM value entries 420 entries are inherently match based on a logical OR operation, each equals term (A==B, C==D, or E==F) in this regular expression may be written as one entry (row) in TCAM 410. As previously mentioned, however, it may be desirable for firewall 200 to support regular expressions in which variables are compared as being not equal to one another and different terms are combined using a logical AND operation. More particularly, it may be desirable to support regular expressions of the general form shown in Table I, below.

TABLE I $P_1$ OPERATOR_E $R_1$
OPERATOR_L
$P_2$ OPERATOR_E $R_2$
OPERATOR_L
.
.
.
$P_N$ OPERATOR_E $R_N$

In Table I, OPERATOR_E may be either "==" or "!=" (referred to as an equality/inequality relationship herein) and OPERATOR_L may be either logical OR or logical AND. In this general form, the regular expression cannot be directly converted into TCAM entries. In other words, the regular expression (if it includes at least one inequality or logical AND) is not TCAM friendly.

Consistent with aspects described herein, firewall 200 may convert a TCAM unfriendly regular expression into a TCAM friendly expression. FIG. 7 is a flow chart illustrating exemplary operations for converting a regular expression to a TCAM friendly regular expression. The operations of FIG. 7 may be performed as part of parsing the filter to generate the TCAM entries (FIG. 5, block 515).

The regular expression, such as regular expression 620, may be initially expressed in a format that includes terms for TCAM mask entries 430 (block 710). Table II, below, illustrates the general format for such a regular expression.

TABLE II

[(pattern & mask_1) OPERATOR_E result_1]
OPERATOR_L
[(pattern & mask_2) OPERATOR_E result_2
.
.
.
[(pattern & mask_N) OPERATOR_E result_N]

In Table II, "pattern" represents the key that will be generated for an incoming data unit. The pattern may have a format similar to input search key 440 (FIG. 4). "Mask" represents the mask for the pattern that will select the bits of the pattern that are applicable to the result. Thus, mask_1 selects the bits of the pattern that are applicable for result_1. OPERATOR_E represents either "==" (equals) or "!=" (not equals), and OPERATOR_L represents either logical AND or logical OR.

In the context of regular expression 620 (FIG. 6), the regular expression, when written in the form of Table II, may be as shown in Table III, below.

TABLE III

[(pattern & mask_for_syn_bit) != result_1]
AND
[(pattern & mask_for_ack_bit) == result_2]
OR
[(pattern & mask_for_fin_bit) != result_3]

Here, result_1, result_2, and result_3 may each represent the result corresponding to the respective bit being set. Thus, results 1, 2, and 3 may each be a bitmap of bits where the bit corresponding to the "syn_bit," "ack_bit," and "fin_bit", respectively, are either set or unset. Although, in this example the comparisons corresponding to result_1, result_2, and result_3 each corresponded to a single bit, it can be appreciated that in general, each comparison may correspond to one or more bits.

Figure 8:
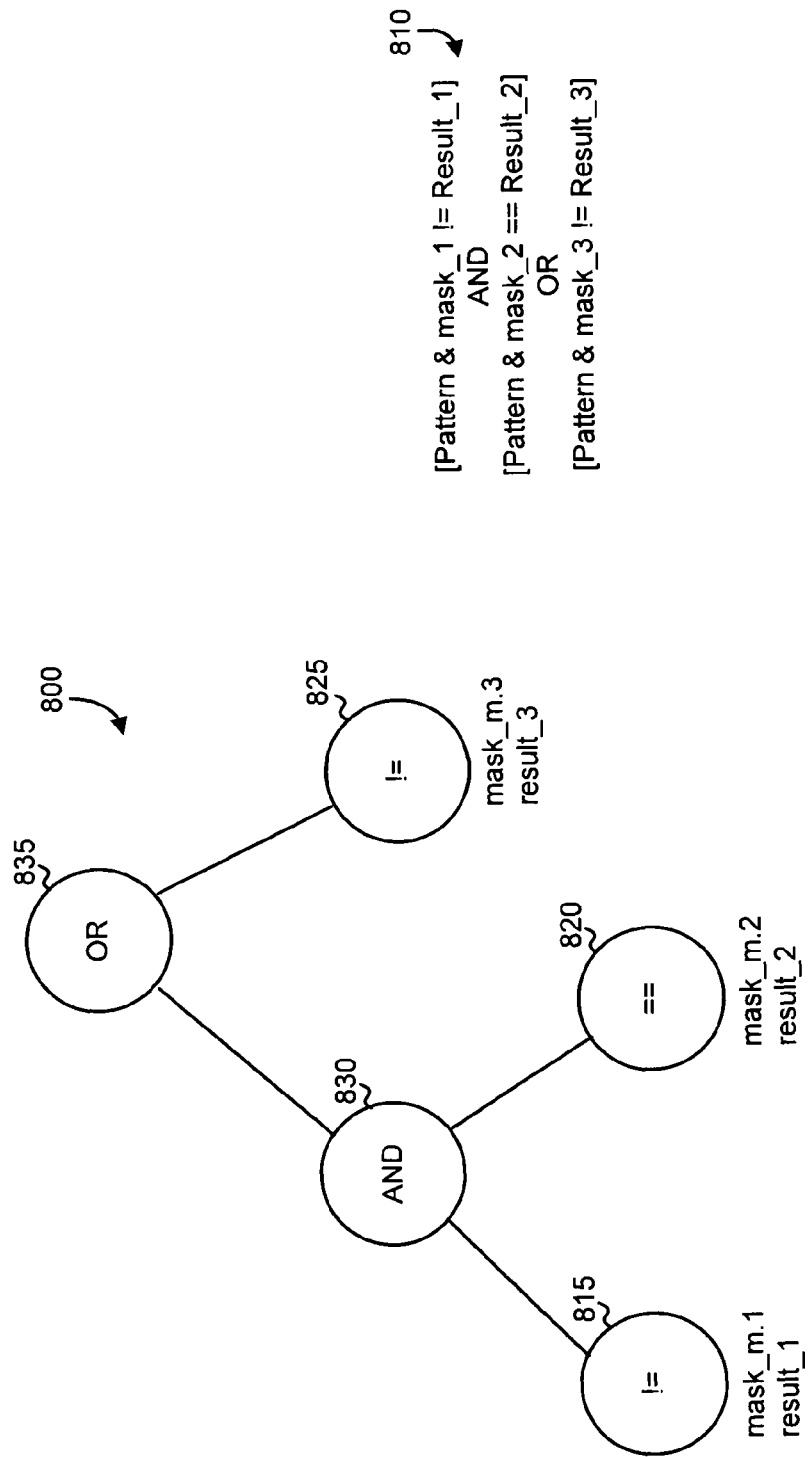
FIG. 8 is a diagram illustrating an exemplary tree structure for a regular expression.

The regular expression shown in FIG. 2 may be represented in the format of a tree data structure (block 720). FIG. 8 is a diagram illustrating an exemplary tree structure 800 for a regular expression 810. Tree structure 800 includes leaf nodes 815, 820, and 825 and intermediate nodes 830 and 835. Tree leaves 815-825 contain the operands (i.e., mask and result in Table II) and the inequality relationship (OPERATOR_E in Table II) and intermediate nodes 830 and 835 contain the operators (OPERATOR_L in Table II). Any regular expression of the form shown in Table II can be expressed as a tree structure.

Although a graphically illustrated tree structure is shown in FIG. 8, it can be appreciated that the tree data structure may not need to be physically displayed or even internally represented by firewall 200. Tree structure 800 is shown to illustrate the concepts described herein.

Firewall 200 may perform leaf inequality reduction on tree structure 800 to convert tree structure 800 into a tree structure in which all the leaves have an "==" inequality relationship (block 730). In particular, firewall 200 may traverse the leaves in a sideways direction in which leaves at a deeper depth are processed first (post-order/breadth-first traversal).

For leaf inequality reduction, only leaves that include an inequality relationship (e.g., leaves 815 and 825 in FIG. 8) need to be converted. Leaves that include an equality relationship are already in a TCAM friendly format and do not need to be converted. Thus, leaves of the form "pattern & mask==result" do not need to be converted while leaves of the form "pattern & mask!=result" will be converted.

Assume that "mask" and "result" in the inequality relationship are each represented by a vector of bits. In other words, mask is of the form:

mask=[$b\_0, b\_1, b\_2, \ldots b\_j$], and result is of the form:

result=[$r\_0, r\_1, r\_2, \ldots r\_j$], where $b\_0 \ldots b\_j$ and $r\_0 \ldots r\_j$ are bits in the mask and the result, respectively. Firewall 200 may perform the inequality reduction to convert each inequality leaf into multiple equality leaves combined with a logic OR.

Figure 9:
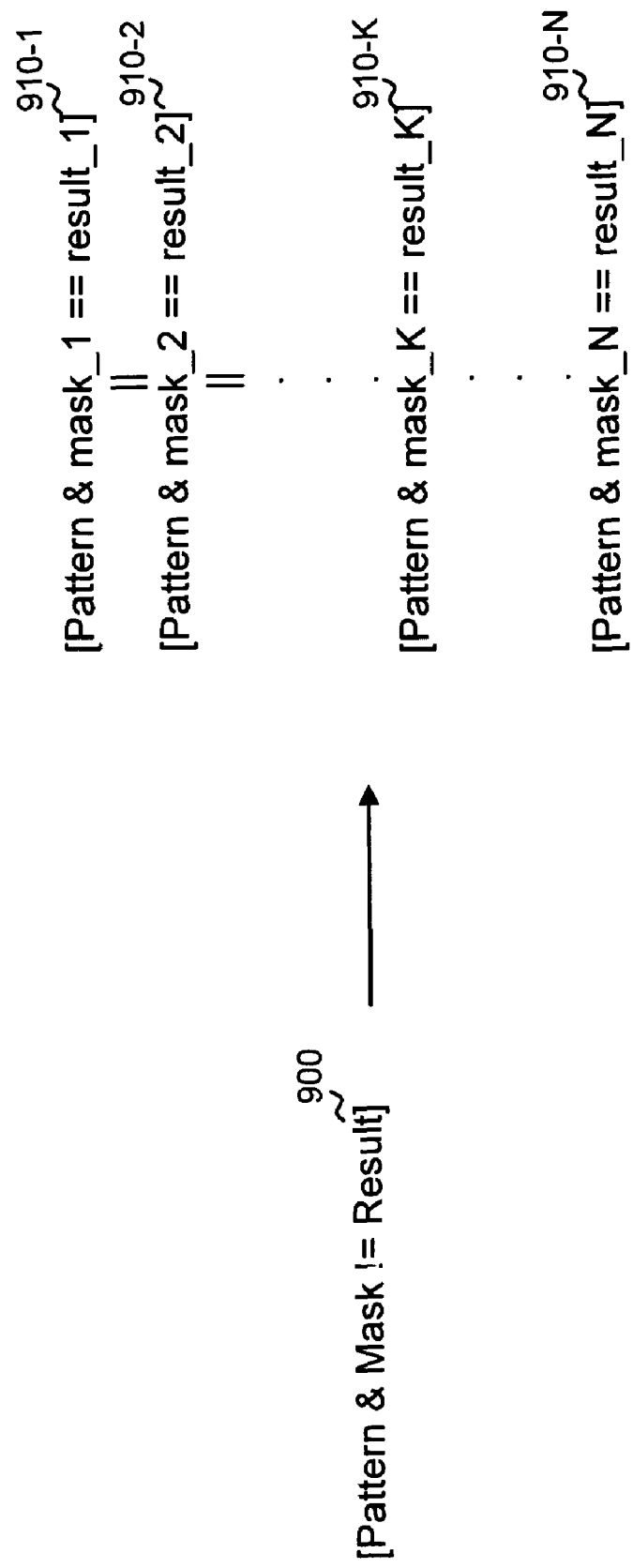
FIG. 9 is a diagram illustrating inequality reduction.

Inequality reduction is illustrated in FIG. 9. As shown, the initial inequality relationship 900 may be converted to N equality relationships, 910-1 through 910-N. The equality relationships 910-1 through 910-N each include a mask vector (mask vectors mask_1 through mask_N) and a result vector (result vectors result_1 through result_N), for a total of N masks and N results. The mask vectors and result vectors may be chosen to satisfy the following rules: (1) each mask vector is unique among the N mask vectors, (2) mask_k & (bitwise logical AND) mask_(k−1) equals zero, (3) the bitwise logical OR of the N mask vectors equals the original mask vector, and (4) result_k=[mask_k^(mask_k & result)], where "^" indicates the exclusive OR (XOR) operator.

As an example of the leaf inequality reduction, consider the inequality equation "mask & pattern!=result," where mask="101" (a 3-bit vector) and result="011" (a 3-bit vector). There are two bits set in the mask, hence, based on rules (1)-(3), there will be two masks (N=2) having the values "100" and "001", and the result will be of the form:

mask_1 & pattern=result_1
OR
mask_2 & pattern=result_2.

From rule (4), the result values will be result_1="010" and result_2="001." In this manner, inequality leaves, such as leaf 815, can be converted to an equality leaf. If this example corresponded to leaf 815, for instance, leaf 815 would be replaced in tree structure 800 by an OR node that is associated with equality leaves.

Figure 10:
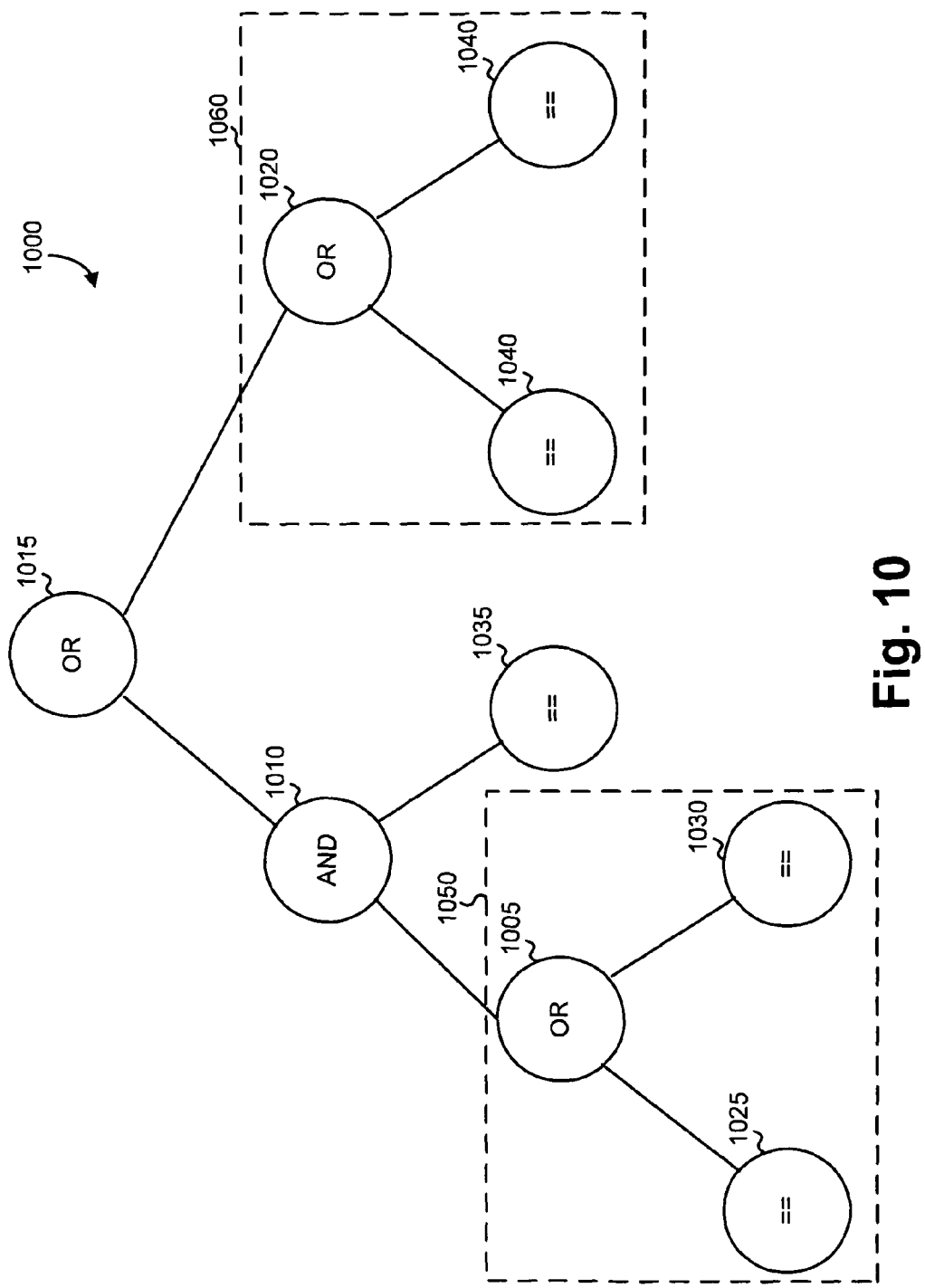
FIG. 10 is a diagram illustrating an exemplary tree structure after inequality reduction.

Assume that each of inequality leaves 815 and 825, after inequality reduction, result in a form similar to that given in the previous example, in which N=2. FIG. 10 is a diagram illustrating the tree structure of FIG. 8 after inequality reduction. As shown in FIG. 10, tree structure 1000 includes four intermediate nodes 1005, 1010, 1015, and 1020. Tree structure 1000 includes five leaves, 1025, 1030, 1035, 1040, and 1045, each of which is associated with an equality operation. Tree structure 1000 includes two sub-trees 1050 and 1060 that were created by the leaf inequality reduction performed on leaves 815 and 825 (FIG. 8). Sub-trees 1050 and 1060 are TCAM friendly sub-trees that include leaf equality relationships and node logical OR operations. The number of leaves in the newly created sub-trees may depend on the bit-count (the number of bits that are set) of the mask that are part of the original leaf. The new sub-trees may be created in a bottom-up direction.

Referring back to FIG. 7, firewall 200 may perform rule reduction on the resultant tree structure, such as tree structure 1000 (block 740). The goal of rule reduction may be to convert all of the nodes in tree structure 1000 to nodes associated with a logical OR. As previously mentioned, multiple TCAM entries that are to be logically ORed with one another can be inherently written to TCAM 410 as different entry rows. Nodes associated with logical OR are thus TCAM friendly. Nodes associated with logical AND operations, however, may be converted via rule reduction.

Figure 11:
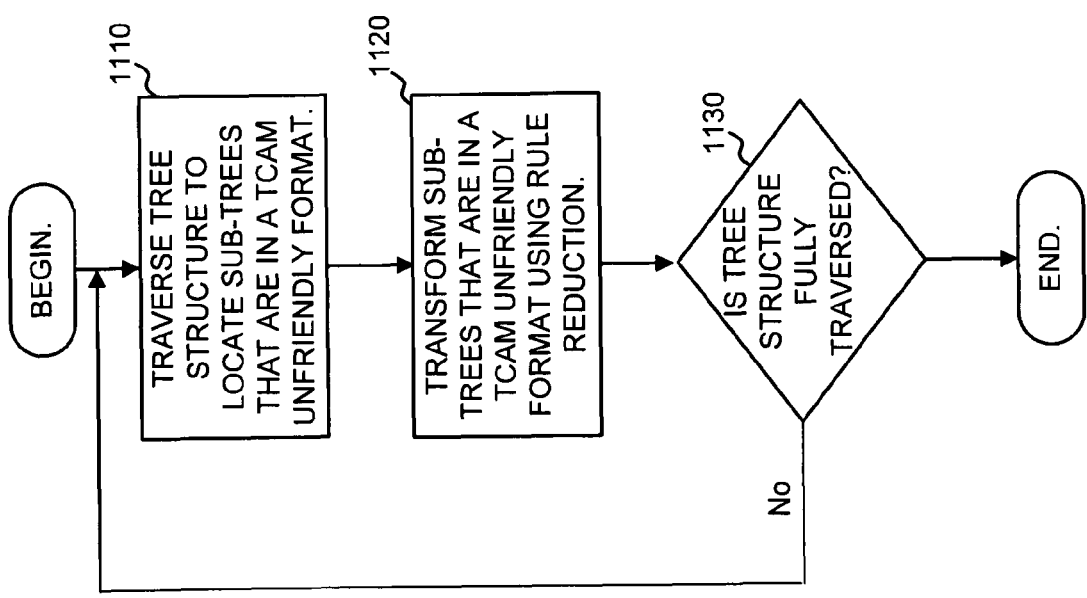
FIG. 11 is a flow chart illustrating exemplary operations for performing rule reduction.

FIG. 11 is a flow chart illustrating exemplary operations for performing rule reduction. Firewall 200 may traverse tree structure 1000 to locate sub-trees that are in a TCAM unfriendly format (block 1110). The traversal may be a bottom-up traversal, starting with the leftmost leaves. For instance, the traversal may start at the bottom most level D, where D is defined as the depth of the tree. All nodes at depth D may be examined and rule reduction performed. Nodes at depth D-1 may then be examined and rule reduced. This procedure may proceed recursively or iteratively until the tree structure is in an entirely TCAM friendly format. In an alternative implementation, instead of starting at level D, rule reduction may begin at level D-2, since, due to leaf inequality reduction, all nodes through level D-1 will be in a TCAM friendly format.

Figure 12:
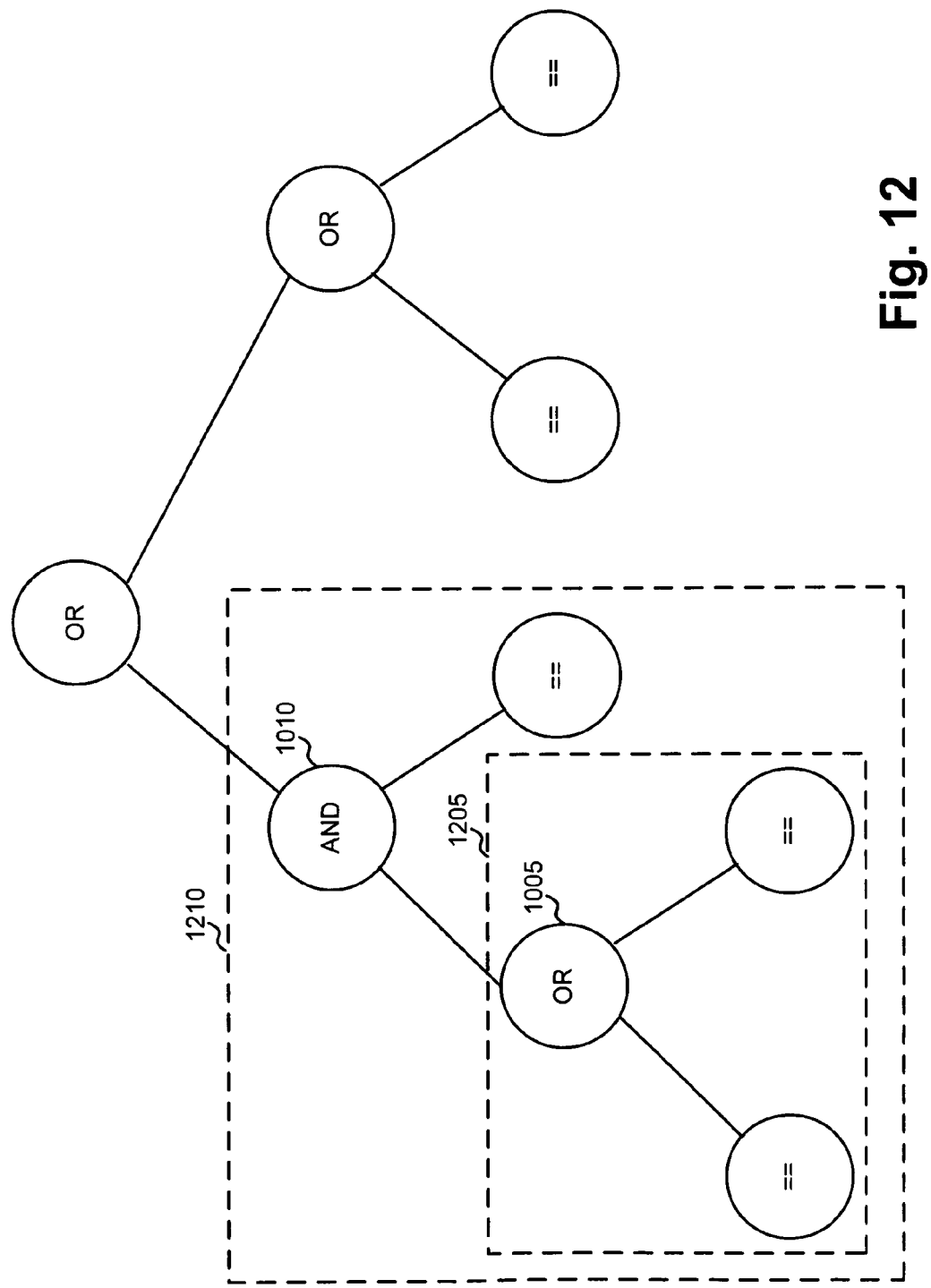
FIG. 12 is a diagram illustrating an exemplary sub-trees in the tree structure of FIG. 10.

A TCAM unfriendly sub-tree may include any sub-tree in which the root node of the sub-tree corresponds to an AND operation. Stated differently, a TCAM unfriendly sub-tree may correspond to minimum sub-tree within the tree structure that is in a TCAM unfriendly format (i.e., in which the root node of the tree corresponds to the AND operation) FIG. 12 is a diagram illustrating sub-trees in the tree structure of FIG. 10. Sub-tree 1205 includes a single OR intermediate node 1005 and is therefore a TCAM friendly sub-tree. Sub-tree 1210 includes an AND intermediate node 1010 and is therefore a TCAM unfriendly sub-tree. Once all sub-trees at a given depth have been rule reduced, rule reduction may be performed on sub-trees at the next higher depth.

Sub-trees that are in a TCAM unfriendly format may be transformed using rule reduction (block 1120). Sub-trees that are in the unfriendly format will have its left and right sub-trees (or leafs) in a format that can be expressed as shown in Table IV, below.

TABLE IV

| Left-Side Sub-Tree | | Right-Side Sub-Tree |
|---|---|---|
| [mask_L1 & pattern == result_L1] | && | [mask_R1 & pattern == result_R1] |
| ‖ | | ‖ |
| [mask_L2 & pattern == result_L2] | | [mask_R2 & pattern == result_R2] |
| ‖ | | ‖ |
| . | | . |
| . | | . |
| . | | . |
| [mask_Lk & pattern == result_Lk] | | [mask_Rk & pattern == result_Rk] |
| . | | . |
| . | | . |
| . | | . |
| [mask_Ln & pattern == result_Ln] | | [mask_Rn & pattern == result_Rn] |

As shown in Table IV, the left and right sides of the sub-trees can be expressed as a series of TCAM row entries that are combined through an OR operation. The result of the left and right sub-trees are then combined with an AND operation.

Consistent with aspects described herein, rule reduction may be performed by bitwise ORing each leaf (i.e., each row in Table IV) of one sub-tree with every other leaf of the other sub-tree. In the notation of Table IV, in which there are $L_n$ leaves in the left sub-tree and $R_n$ leaves in the right sub-tree, this will result in $L_n * R_n$ TCAM friendly leaves. Each of these leaves may be combined with a logical OR operator. Table V, below, illustrates the resultant set of TCAM friendly leaves for the sub-trees of Table IV.

TABLE V

[(mask_R1 | Mask_L1) & pattern == (result_R1 | result_L1)]
‖
[(mask_R1 | Mask_L2) & pattern == (result_R1 | result_L2)]
.
.
‖
[(mask_R1 | Mask_Ln) & pattern == (result_Rn | result_Ln)]
‖
[(mask_R2 | Mask_L1) & pattern == (result_R2 | result_L1)]
.
.
‖

TABLE V-continued

[(mask_R2 | Mask_Ln) & pattern == (result_R2 | result_Ln)]
.
.
.
‖
[(mask_Rn | Mask_L1) & pattern == (result_Rn | result_L1)]
.
.
.
‖
[(mask_Rn | Mask_Ln) & pattern == (result_Rn | result_Ln)]

Referring back to FIG. 11, the tree traversal and transformation for TCAM unfriendly sub-trees may continue until tree structure 1000 is fully traversed (block 1130). The resulting tree-structure will then be representable in the form shown in Table V; a completely TCAM friendly format. For instance, each row in Table V may be written to TCAM 410 where the "result" portion is written as a value entry 400 and the "mask" portion is written as a mask entry 430.

CONCLUSION

As described above, an arbitrary regular expression, such as an expression for matching bit conditions, may be transformed into a format suitable for programming a TCAM. The regular expression may be transformed using "leaf inequality reduction" and "rule reduction," as described herein.

While a series of operations have been described with regard to FIGS. 5, 7, and 11, the order of the acts may be varied in other implementations consistent with the invention.

It will also be apparent that aspects described herein may be implemented in many different forms of software, firmware, and hardware in the implementations illustrated in the figures. The actual software code or specialized control hardware used to implement aspects described herein is not intended to limit the scope of the invention. Thus, the operation and behavior of the aspects were described without reference to the specific software code—it being understood that software and control hardware can be designed to implement the aspects based on the description herein.

Further, certain aspects described herein may be implemented as "logic" or as a "component" that performs one or more functions. This logic or component may include hardware, such as an application specific integrated circuit or a field programmable gate array, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed:

1. A method comprising:
receiving, by a network device, a filter definition that includes one or more input regular expressions that include variables that are compared to a result based on an equality or inequality relationship and where multiple variables are combined using logical operations selected from a set of logical operations including logical AND and logical OR operations;
converting the one or more input regular expressions into a format in which the equality or inequality relationships are converted to a pure equality relationship and the multiple variables are combined using only logical OR operations; and
programming, in the network device, a ternary content-addressable memory (TCAM) to implement the filter definition, where the TCAM is programmed based on the converted one or more input regular expressions.

2. The method of claim 1, where the input regular expressions include expressions for bit operations that apply to a data packet.

3. The method of claim 1, where converting the one or more input regular expressions includes:
representing the input regular expression as a tree structure that includes leaves representing the equality or inequality relationships and nodes representing the logical AND or logical OR operations.

4. The method of claim 3, where converting the one or more input regular expressions further includes:
converting the leaves of the tree structure that represent inequality relationships to sub-tree structures that include all equality relationships.

5. The method of claim 4, where the leaves are converted in a post-order or breadth-first traversal of the tree structure.

6. The method of claim 3, where converting the one or more input regular expressions includes:
traversing the tree structure to locate sub-trees that include nodes representing logical AND operations; and
transforming the located sub-trees by bitwise ORing each leaf in a left portion of each of the located sub-trees with a right portion of each of the located sub-trees.

7. The method of claim 3, where programming the TCAM includes:
storing a value entry and a mask entry in the TCAM for each leaf of the tree structure.

8. The method of claim 1, where the variables represent vectors that include multiple bits of information.

9. A network device comprising:
a ternary content-addressable memory (TCAM) that stores rules that are matched to incoming network data units to implement a network filter; and
a control portion to control operation of the network device, the control portion to:
receive a filter definition that includes at least one filter condition that includes a bit operation represented as a regular expression, the regular expression including variables that are compared to a result based on an equality or inequality relationship and where multiple variables are combined using logical operations selected from a set of logical operations including logical AND and logical OR operations,
convert the regular expression into a format in which the equality or inequality relationships are converted to a pure equality relationship and the multiple variables are combined using only logical OR operations, and
program the TCAM to embody the received filter definition, where entries in the TCAM corresponding to the regular expression are programmed based on the converted regular expression.

10. The network device of claim 9, where the regular expressions include regular expressions for bit operations that apply to a data packet.

11. The network device of claim 9, where the control portion converts the regular expression by representing the regular expression as a tree structure that includes leaves representing the equality or inequality relationships and nodes representing the logical AND or logical OR operations.

12. The network device of claim 11, where the control portion further converts the regular expression by converting the leaves of the tree structure that represent inequality relationships to sub-tree structures that include all equality relationships.

13. The network device of claim 11, where the leaves are converted in a post-order or breadth-first traversal of the tree structure.

14. The network device of claim 11, where the control portion further converts the regular expression by traversing the tree structure to locate sub-trees that include nodes representing logical AND operations; and transforming the located sub-trees by bitwise ORing each leaf in a left portion of each of the located sub-trees with a right portion of each of the located sub-trees.

15. The network device of claim 11, where the TCAM is programmed to store a value entry and a mask entry in the TCAM for each leaf of the tree structure.

16. The network device of claim 11, where the variables represent vectors that include multiple bits of information.

17. A network device comprising:
  logic to receive a filter definition that includes one or more input regular expressions that include variables that are compared to a result based on an equality or inequality relationship and where multiple variables are combined using logical operations selected from a set of logical operations including logical AND and logical OR operations;
  logic to convert the one or more input regular expressions into a format in which the equality or inequality relationships are converted to a pure equality relationship and the multiple variables are combined using only logical OR operations; and
  logic to program a ternary content-addressable memory (TCAM) to implement the filter definition, where the TCAM is programmed based on the converted one or more input regular expressions.

18. The network device of claim 17, where the network device includes a firewall filter.

19. The network device of claim 17, where the input regular expressions include expressions for bit operations that apply to a data packet.

20. The network device of claim 17, where the variables represent vectors that include multiple bits of information.

* * * * *